UNITED STATES PATENT OFFICE 2,176,423

ESTERS OF SULPHODICARBOXYLIC ACIDS

Alphons O. Jaeger, Greentree, Pa., assignor to American Cyanamid & Chemical Corporation, New York, N. Y., a corporation of Delaware No Drawing. Application January 13, 1936, Serial No. 58,988

7 Claims. (Cl. 260—481)

This invention relates to new esters of aliphatic sulphodicarboxylic acids and to a new method of producing such esters.

Esters of sulpho saturated and unsaturated aliphatic dicarboxylic acids such as, for example, mono and disulphosuccinic, sulphochlorsuccinic, sulphobromsuccinic, sulphoadipic, sulphopyrotartaric, sulphoglutaric, sulphosuberic, sulphosebacic, sulphobutylsuccinic, sulphobenzylsuccinic, sulphomaleic, sulphofumaric, sulphodimethylsuccinic, sulphomethylglutaric, sulphopimelinic, sulphopropylsuccinic, sulpho-octylglutaric, sulphobenzylmalonic, and other sulphonated dicarboxylic acids of the aliphatic series have never been prepared hitherto. These esters, particularly in the form of their alkali forming metal salts, are of great importance in industry by reason of their extraordinary wetting powers in various aqueous and organic solutions, emulsions or suspensions. They are also of importance as detergents, emulsifying agents, and the like.

The esters described above may be considered as falling in two classes, namely, esters of aliphatic dicarboxylic acid in which the aliphatic chain contains no substituent other than the sulphonic acid group and substituted aliphatic sulphodicarboxylic acids. The esters of the first class are specifically claimed in my copending application Serial No. 682,629 filed July 28, 1933, now Patent No. 2,028,091, dated January 14, 1936, of which the present application is in part a continuation.

The esters of the substituted aliphatic sulphodicarboxylic acids would naturally be expected to have properties differing in some respects from those falling under the claims of the above application, but I have found that the members of this class also possess wetting powers in various aqueous and organic solutions, emulsions or suspensions. The esters of aliphatic sulphodicarboxylic acids in which the carbon chain is substituted by one or more alkyl, aryl, hydroaromatic or terpene radicals, for example, possess wetting properties almost as great as those of the esters of the corresponding unsubstituted acids, and this is particularly true in cases where at least one of the carboxylic acid groups has been esterified with an alcohol containing three or more carbon atoms. The behavior of such esters as regards variations in their wetting and emulsifying properties with an increase in the number of carbon atoms in the alcohol radical is similar to that of the esters of the unsubstituted acids, but the increase of the molecular weight of the acid radical resulting from substitution necessitates the use of an alcohol having at least three carbon atoms when esters having strong wetting properties are desired. For this reason the esters formed from alcohols having three or more carbon atoms are a special class of substances which it is an object of the present invention to produce.

The invention is not limited to the production of esters of aliphatic sulphodicarboxylic acids in which the aliphatic chain contains a hydrocarbon substituent. On the contrary, a large number of compounds containing other or additional substituents can be produced and are included therein; for example, aliphatic sulphodicarboxylic acids containing unsubstituted or substituted alcohols, ethers, amino groups, or one or more additional sulphonic groups may be produced as well as those containing one or more hydroxy, halogen or nitro groups. Esters of substituted acids of this class will naturally have properties varying with the nature of the substituents introduced into the hydrcarbon chain, which properties will be more specifically pointed out in the following examples. However, these substituted esters all share one common characteristic with the unsubstituted and hydrocarbon substituted aliphatic sulphodicarboxylic acid esters: they all possess good solubility in water and surface tension reducing properties which render them valuable wetting and emulsifying agents. For this reason, there are many cases in which the special properties resulting from the presence of inorganic and other substituents in the aliphatic chain of the dicarboxylic acid will be of greater advantage than are those of the unsubstituted acids, although as a rule the esters of the unsubstituted acids have sufficiently high wetting and emulsifying powers for most purposes. Accordingly, the esters of aliphatic dicarboxylic acids containing these substituents, which esters are produced by reaction with alcohols and phenols of all classes are of special importance, and are included in the invention.

A list of a few typical uses for the esters of the present invention are the following:

Emulsifying agents.
Aids in carbonizing.
Washing agents.
Dye assistants.
Dispersing agents in making emulsions and dispersions of various chemicals, such as emulsions of hydrocarbons of various groups of the aliphatic and aromatic series.
Terpene emulsions.
Wetting compositions in emulsified form.

Dispersing agents in making emulsified germicides.
Color lakes.
Dye preparations.
Boring oil.
Drilling oils.
Emulsions of various animal and vegetable fats and oils.
Greasing compositions in emulsified form.
Lubricating compositions containing vegetable or animal fats and oils.
Solvents for fats in emulsified form.
Wetting compositions containing oils in emulsified form.
Wire-drawing oils in emulsified form.
Printing inks.
Writing inks.
Insecticidal preparations in emulsified form.
Emulsified dressing compositions containing various substances such as shellac, gums, natural and synthetic resins, fats and oils.
Emulsified fat liquoring baths.
Emulsified finishing compositions.
Emulsified soaking compositions containing neat's-foot oil or other oils to be used as leather fat liquors.
Emulsified waterproofing compositions.
Automobile polishes.
Cleansing compositions containing soaps.
Compositions for cleansing paint and metal surfaces.
Degreasing and greasing compositions in emulsified form.
Detersive and scouring compositions.
Furniture polishes in emulsified form.
Metal polishes in emulsified form.
Scouring compositions for woodwork, linoleum, rugs, and the like.
Shoe creams and polishes in emulsified form.
Waterproofing compositions in emulsified form for treating miscellaneous fibrous and other compositions of matter.
Coating compositions for oilcloth and linoleum.
Asphaltic paints and varnishes.
Emulsified paints and varnishes.
Pigment emulsions.
Shellac emulsions.
Emulsified preparations used for the treatment of paper and pulp products.
Sizing compositions in emulsified form containing rosin, casein, starches and the like.
Waxing compositions in emulsified form.
Creams in emulsified form.
Emulsified shampoos.
Lotions.
Latherless shaving creams.
Various emulsified perfumes and cosmetics.
Emulsions containing petroleum or heavy petroleum distillates.
Emulsified cutting oils for lathe and screw-press work.
Kerosene emulsions.
Naphtha emulsions.
Soluble greases in emulsified form.
Soluble oils in emulsified form, for lubricating textile machinery.
Various emulsified textile oils.
Rubber compositions in emulsified form.
Special emulsified preparations used for coating, projecting, decorating and other surface treating of rubber merchandise.
Hand-cleansing compositions in emulsified form.
Various emulsified cleansing and scouring compositions containing soap.
Dressing compositions in emulsified form.
Dispersions used for degreasing and washing raw wool.
Emulsified preparations for degumming silk.
Emulsions for soaking silk.
Emulsified mercerizing baths.
Special lubricating compositions used in weaving, knitting, warping and winding.
Emulsions for fire extinguishers.
Emulsions for the preservation and impregnation of wood.
Emulsions for mordanting.

The esters may be prepared by esterifying the sulpho acids, which acids may be prepared either by sulphonating the unsulphonated saturated acid with $SO_3$, chlorsulphonic acid or other strong sulphonating agent or by adding a sulphite or bisulphite to the corresponding unsaturated acid or its salts. Another method of producing the sulpho acid is to treat the halogenated saturated acid with an alkali sulphite preferably under pressure.

While the present invention in its broad aspects of new esters as new chemical compounds is not concerned with the particular method by which the esters are prepared, in a more specific aspect an improved process of preparing the esters is included. This process consists in esterifying the corresponding unsaturated acid and adding a bisulphite to the ester. This process presents marked advantages over the alternative process of esterifying the already prepared sulpho acid, since the unsaturated acid is practically in all cases more easily esterified and in the form of the ester can be readily purified where it is desired to produce a relatively pure product from a crude unsaturated acid. This is of particular importance in conjunction with the production of esters of sulphosuccinic acid because the raw material, maleic and fumaric acids, can be readily obtained in a somewhat crude form as a byproduct from the manufacture of phthalic anhydride, by the catalytic oxidation of naphthalene. As the esters of sulphosuccinic acid can be manufactured very cheaply and show extraordinary powers as wetting agents and emulsifying agents and are commercially of prime importance, the preferred process is of especial economic value in conjunction with the production of esters of sulphosuccinic acid.

The esters of the sulphoaliphatic dicarboxylic acids are of the most various types. Thus, for example, esters of low molecular alcohols such as methyl and ethyl and propyl alcohols, are very soluble in water in the form of their alkali metal salts, and form excellent detergents. Esters of higher molecular alcohols show increasing powers as wetting agents, but in general with a decreasing solubility in water in the form of their alkali metal salts. Thus the butyl esters show considerable increased wetting powers over the propyl ester and the diamyl esters show extraordinarily high wetting powers and still have excellent solubility in water. These amyl esters may be single esters such as normal amyl, isoamyl, or secondary amyl esters; or mixed amyl esters may be obtained by esterifying with the mixture of amyl alcohols obtained by the hydrolysis of halogenated pentane fraction of natural gas and sold under the trade name of "Pentasol." Even higher wetting power is obtained with esters of the various octyl alcohols, such as, for example 2 ethyl hexyl alcohol and capryl alcohol.

Alcohols of still higher molecular weight are of importance as wetting agents and particularly as emulsifying agents where the solubility in water is not of prime importance. Typical examples are, lauryl esters and stearyl esters. The esters may be prepared from the pure alcohols or for most purposes it is sufficient to use the technical grade of mixed alcohols obtained from the reduction of various fats and fatty acid mixtures.

In addition to the monohydric paraffin alcohols, various ether alcohols are of importance such as, for example, the ethers of ethylene glycol, for instance, the methyl, ethyl, butyl, amyl, ethers, etc., which are readily obtainable in the trade. Ethers of diethylene glycol such as the methyl, ethyl or butyl ethers are likewise of importance and produce esters which are valuable wetting agents and detergents. The invention is in no sense limited to esters of aliphatic monohydric alcohols but includes also esters of cyclic alcohols and phenols which are of importance for many purposes. Thus, for example, benzyl esters, esters of phenol, cresols, xylenols, naphthols and the like, are included in the invention. Alicyclic alcohols such as cyclohexanol, methylhexanol, likewise form esters having important and useful properties. Esters of various terpene alcohols are also included, such as borneol, fenchyl alcohols, methyl alcohols, and the like, can be prepared and are included.

Heterocyclic alcohols also form esters with desirable properties. Examples of typical heterocyclic alcohols are furfuryl alcohols, tetrahydrofurfuryl alcohol, and the like. Alcohols of various types may also be used.

In addition to the esters in which two molecules of the same alcohol unite with the carboxyl groups of the dicarboxylic acid, a series of very important esters can be obtained in which one carboxyl group unites with one alcohol and another carboxyl group unites with a different alcohol. These mixed esters are particularly important where it is desired to obtain some of the valuable wetting and emulsifying properties of high molecular alcohols, such as, for example, lauryl and stearyl alcohols, without sacrificing to too great an extent the water solubility of their alkali metal salts. Thus, for example, the mixed ethyl-lauryl and methyl-stearyl esters of a sulpho acid such as sulphosuccinic or sulphoadipic acid possess many of the properties of the dilauryl or distearyl esters but are considerably more soluble in water. Obviously of course, the number of mixed esters which can be produced is extraordinarily large and only a few typical members are given in the specific examples of the invention to follow. The technique of producing mixed esters is substantially the same for all of the mixed esters and a wide variety may be produced and all are included in the present invention. While most of the mixed esters of greatest importance are those in which one alcohol is high molecular and the other low molecular, it should be understood that the invention is in no sense limited in this particular modification to mixed esters in which one alcohol is high molecular and the other low. Thus, for example, very desirable mixed esters may be obtained in which the two alcohols are of comparable molecular weight. Such esters are, for example, mixed amyloctyl, mixed ethoxy ethylamyl and the like. It is thus possible to produce esters which have desirable properties of two different alcohols embodied in the same product.

Certain mixed esters of a complex nature are also obtainable, for example by esterifying ethylene oxide or similar alkylene oxides such as propylene or butylene oxide with acids such as maleic acid and then adding the sulpho group or by esterifying the sulphodicarboxylic acid directly with ethylene oxide.

While some of the more important esters of the present invention are those with monohydric alcohols such as the ones enumerated above, important esters can also be obtained with polyhydric alcohols. Thus, for example, an ester may be obtained with glycerine which is water soluble in the form of its alkali or ammonium salt. Ethylene glycol and other glycols such as propylene and butylene glycol produce new esters having desirable properties, notably high solubility in water. Where a polyhydric alcohol is used such as glycerol, glycols, polyglycerols, pentaerythrite, and the like, part of the hydroxyl group only may be united with the sulphodicarboxylic acid. Thus, for example, a monoglyceryl ester of sulphosuccinic acid may contain a free hydroxyl group. If desired, this may be esterified with another acid. A further series of mixed esters are obtained when the acid ester of a monohydric alcohol and a sulphodicarboxylic acid is caused to unite with one or more hydroxyls of a polyhydric alcohol. A large number of these mixed esters can be produced, some of which are resins of various types, and for the most part they show solubility in water in the form of the alkali metal or ammonium salts. Such esters of polyhydric alcohols which show resinous characteristics are applicable to resinous coating compositions which are to be applied in aqueous solution and open up a considerable field to synthetic resin compositions which was hitherto more or less closed.

Instead of esterifying a compound which is purely a mono or polyhydric alcohol, esters can of course be produced from other compounds which contain hydroxyl groups. Thus, for example, ricinoleic acid or castor oil can be esterified with a sulphodicarboxylic acid to form a further series of esters having very important wetting powers, particularly when the wetting agent has to be used in alkaline solution. Such esters are, of course, also included in the invention.

The most common esters of the present invention are those in which the sulphonic group of the acid is a single sulphonic group. It is, of course, possible to esterify di and polysulpho acids with the production of corresponding di and polysulpho esters, and such esters are of course included.

Most of the commercially useful esters are employed in the form of their alkali metal, usually sodium salts. For some purposes, however, it is undesirable to have an alkali metal present in the compound and very effective products are obtained in the form of salts with ammonia or other amine basis, such as for example, triethanolamine, mono-, di- or trimethyl or ethyl amine, etc. It is also possible to form salts of alkaloids and other organic bases capable of salt formation with the sulphonic group. Thus, for example, salts with pyridine, nicotine, cinchona alkaloid and the like may be prepared and have the important advantage that they are readily applied in the form of aqueous dispersions because of the high wetting power of the esters of the sulpho acid. This permits the active organic base to be distributed in an aqueous material instead of a nonaqueous material, and is of importance in aiding the use of nicotine or pyridine as an insecticide or cinchona alkaloids as mothproofing agents since they can be applied in aqueous dispersions instead of solutions in organic material which for some purposes is a more desirable method of application. The application of certain basic dyes in the form of their salts with the sulpho esters is also important and such salts are likewise included.

The esters of the present invention possess two important properties which render their use as wetting agents, detergents or emulsifiers of particular importance. The first is their property of operating in hard water by reason of the great solubility of their calcium and magnesium salts. The second property is their remarkable resistance to acid in which respect they show great superiority to nearly all wetting agents which have been developed up to the present time.

Because of the large number of esters which can be prepared according to the present invention, only a few are illustrated in the following specific examples, it being understood that these are typical examples of the large number of esters included in the present invention. In the specific examples various processes of producing the esters have been illustrated. It should be understood that the invention is not limited to such illustrations. Thus, for example, if a particular ester is described in a specific example as produced by a particular process, this does not limit this ester to production by the illustrated process as, in general, the esters can be produced by any of the alternative methods which have been briefly described and which will be illustrated in greater detail in the specific examples.

The efficiency of the new detergent processes of the present invention are exemplified by a comparison with the wetting power of the sodium salt of diamyl sulphosuccinic acid and the sodium salt of sulphonated isobutyl naphthalene, a standard wetting agent which has hitherto been used. The test, which consisted in measuring the time required to wet out a piece of flannel about 1 cm. square in different concentrations of the wetting agents and in neutral and acid solution, is shown by the following table:

| Concentration, percent | Distilled $H_2O$ | | $H_2SO_4$ 2% | |
|---|---|---|---|---|
| | Amyl sulpho succinate, secs. | Nekal BX, secs. | Amyl sulpho succinate, secs. | Nekal BX, secs. |
| 0.5 | 1.0 | 3.0 | Instantly | 0.75 |
| 0.25 | 3.5 | 0.0 | 0.5 to 1.0 | 1.5 to 2.0 |
| 0.1 | 9.0 | 30.0 | 2.5 | 3.5 |

Another comparison with the sodium salt of sulphonated isopropyl naphthalene is made in the washing of apples with hydrochloric acid solutions to remove arsenic and lead residues resulting from the spraying of the apples with insecticidal sprays. At a concentration of .75%, the sodium salt of sulphonated isopropyl naphthalene and the sodium salt of dioctyl sulphosuccinate gave substantially the same results, but on reducing the concentration to .5 and .25%, the effectiveness of the sulphonated isoproyl naphthalene dropped very rapidly to an efficiency below that which is commercially useful, that is to say, the amount of residue left after washing exceeded the requirements laid down by the Health Departments of the United States and Great Britain, whereas with dioctyl sulphosuccinate, even at the low concentrations, satisfactory results were obtained.

Example 1

1 mol. of sulphomaleic acid in the form of its mono-sodium or potassium salt is distilled with 4 to 5 mols. of methyl alcohol, a small amount of sulphuric acid being added as an esterification catalyst. The distillate is fractionated under a reflux, water or aqueous methyl alcohol is withdrawn from the system from the bottom of the fractionating column and the operation is continued until a conversion of 95% or higher is obtained. The mixture is then neutralized with caustic soda or, if desired, with sodium carbonate and the excess alcohol is recovered by distillation. The residual aqueous solution is evaporated to dryness and forms a white, rubbery acid having no definite melting point and showing a very great solubility in water. The product is the sodium or potassium salt of dimethyl sulphomaleate.

Example 2

1 mol. of normal diamyl maleate having a boiling point from 146 to 148° C. at 2 mms. is mixed with 1.5 mols of sodium bisulphite and the whole agitated at 100° C. with water in the proportion of 100 parts by weight of water to 256 parts by weight of diamyl maleate. Preferably the agitation is carried out under slight pressure to avoid loss of $SO_2$ and is continued until a sample is completely soluble in water. The mixture is dried and if required, freed from inorganic salts by dissolving in an organic solvent such as benzene, filtering and evaporating the benzene. The product, which is diamyl sulphosuccinate, is a transparent soapy solid which can be ground with some difficulty to a white powder. It is very soluble in water, benzol, alcohol or gasoline. It is a wetting agent of great power and an excellent detergent particularly because its calcium salt shows almost as much solubility as the sodium salt.

Example 3

340 parts of dioctyl fumarate (boiling point 180 to 190° C. at 4 mms.) is prepared by the esterification of fumaric acid with 2 ethyl hexanol and is mixed with 109 parts of sodium bisulphite and sufficient water to form a 50% solution. The addition of sodium bisulphite is carried out as described in Example 2 and the product purified in the same way. The resulting sodium salt of dioctyl sulphosuccinate is a transparent rubbery mass which cannot be ground to a powder. It is soluble in water and the common organic solvents, and shows a wetting power even greater than the diamyl sulphosuccinate.

Instead of recovering the dioctyl sulphosuccinate as described in Example 2, it may be salted out by any suitable salt such as sodium chloride or sodium sulphate. Some of the salt may be precipitated or retained by the dioctyl succinate and this is unobjectionable since the addition of a certain amount of salt increases the wetting power of this ester. The salt may have no wetting power itself or the salt of another wetting agent such as, for example, the sodium salt of isopropyl naphthalene sulphonic acid may be added. Such mixed wetting agents are very useful for certain purposes.

The triethanol amine salt can be prepared by reacting with triethanol amine hydrochloride and is likewise water soluble. Similarly salts can be prepared with pyridine, nicotine, or cinchona alkaloid.

Example 4

372 parts of the commercial mixed lauryl alcohols are mixed with 242 parts of the disodium salt of sulphosuccinic acid, 50 parts of sulphonic acid and 400 parts of toluene. The mixture is distilled until approximately 30 parts of water have collected in the distillate, whereupon the mixture is neutralized and dried giving a mixture of the sodium salt of dilauryl sulphosuccinate and sodium sulphate. The product is a white, rubbery substance, slightly soluble in water, readily soluble in most organic solvents and giving a soapy solution of high emulsifying power.

Example 5

340 parts of dicapryl maleate are agitated with 109 parts of sodium bisulphite, dissolved in 100 parts of water until the reaction mixture is soluble in water. Preferably the agitation is under slight pressure and at about 100° C. as in the case of Example 2. The mixture is dried and purified by solution in organic solvents as in Example 2, and the product which is dicapryl sodium sulphosuccinate is a transparent, rubbery substance which is considerably more soluble in water than the dioctylisomers. The corresponding ammonium salt can be readily prepared and is likewise very soluble in water. Instead of purifying the dicapryl sulphosuccinate as described in Example 2, it may be salted out as is described in Example 3 and the presence of some additional salt improves the wetting power of the ester.

Example 6

242 parts of the disodium salt of sulphosuccinic acid are mixed with 462 parts of fenchyl alcohol and 500 parts of monochlorbenzene, 50 parts of sulphuric acid are added and the mixture is slowly distilled until the theoretical quantity of water produced by the esterification has collected in the distillate. The mixture is neutralized with caustic soda and steam distilled to remove the excess fenchyl alcohol and monochlorbenzene. The remaining solution is then evaporated to dryness and constitutes the difenchyl sodium sulphosuccinate which is a white powder moderately soluble in water and in organic solvents.

Example 7

256 parts of the disodium salt of alpha sulphopyrotartaric acid which may be obtained by the action of sodium sulphite on itaconic, citraconic or mesaconic acid are mixed with 270 parts of the ethyl ether of ethylene glycol and sufficient sulphuric acid to combine with the sodium attached to the carboxyl group of the pyrotartaric acid and to liberate a little free sulphonic acid. The mixture is distilled until esterification is complete, the acid neutralized and the excess ethyl ether of ethylene glycol removed by steam distillation. The residual sludge is then evaporated to dryness and forms a jelly-like mass of sodium diethoxyethyl sulphopyrotartrate. The compound is very soluble in water and shows good wetting powers.

Example 8

Maleic acid is esterified with the butyl ether of ethylene glycol and 386 parts of the ester thus produced are sulphonated with sodium bisulphite as described in Example 2. The product, which is the sodium salt of the dibutoxy diethyleneglycol sulphosuccinate, is very similar to that of Example 7.

Example 9

294 parts of crystalline dicyclohexyl glutaconate are produced by esterifying glutaconic acid with cyclohexanol, are mixed with 110 parts of sodium bisulphite as a 50% aqueous solution, the mixture being agitated at 100 to 110° C. until the whole is water soluble. Thereupon 500 parts of water are added, the mixture heated, filtered and allowed to crystallize. The resulting cyclohexyl ester of sulphoglutaric acid is quite crystalline, the substance having no definite melting point and is readily soluble in water.

Example 10

248 parts of monosodium salt of sulphoadipic acid are esterified with 324 parts of benzyl alcohol using the procedure described in Example 6 but adding only 1 part of sulphuric acid to liberate a small amount of the free sulphonic acid to act as the catalyst. The product after removing any excess alcohol, is the sodium salt of dibenzyl sulphoadipate, being a white powder soluble in water.

Example 11

282 parts of the diphenyl ester of mesoconic acid (melting point 66 to 67° C.) which may be obtained by heating mesaconic acid dichloride with sodium phenolate in toluene, are agitated for 24-48 hours with 104-208 parts of sodium bisulphite as a 50% water solution. The agitation preferably takes place under pressure at somewhat above 100° C. and is continued until the mixture is completely soluble in water, whereupon toluene is added and the mixture distilled until all the water is removed. The residual toluene is filtered and the toluene evaporated leaving a white solid residue of sodium diphenyl sulphopyrotartrate. The product is readily soluble in water from which it may be crystallized on long standing.

Example 12

284 parts of the dimaleic ester of tetrahydrofurfuryl alcohol are agitated at 100 to 110° C. with 109 parts of sodium bisulphite in the form of a 50% aqueous solution. The product is then purified as described in Example 2 and is an amorphous white solid possessing no definite melting point, being exceedingly soluble in water and organic solvents. The product is the sodium salt of the ditetrahydrofurfuryl ester of sulphosuccinic acid.

Example 13

Sulphosuberic acid is prepared by sulphonating suberic acid, and 276 parts of the monosodium salt are esterified with a methyl isobutyl carbinol. The excess alcohol is distilled off and the product which is the diester of sodium sulphosuberic acid with methyl isobutyl carbinol is a white solid which is very soluble in water.

Example 14

326 parts of the disodium salt of sulphosebacic acid is esterified with excess butyl alcohol and slightly more than ½ mol. of sulphuric acid for every molecule of the disodium sulphosebacate. The excess butyl alcohol is distilled off and the dibutyl sodium sulphosebacate is recovered as a white powder which is soluble in water.

Example 15

Distearyl maleate is prepared by esterifying a technical alcohol containing stearyl alcohol as its main constituent with maleic anhydride, the esterification being carried out in a toluene solution. The crude product is recrystallized with benzol, and 124 parts of the ester are heated at 100° C. for 24 hours with 42 parts of sodium bisulphite and 40 parts of water, vigorous agitation being maintained during the heating. The product is then isolated and purified as in Example 2 and is a white, soapy powder, very slightly soluble in water. It constitutes the sodium salt of distearyl sulphosuccinate.

Example 16

Maleic acid is esterified with oleyl alcohol in the same manner as described in Example 15. 124 parts of the ester are then heated at 100° C. for about 24 hours with 42 parts of sodium bisulphite in 40 parts of water, vigorous agitation being continually maintained. The sodium salt of dioleyl sulphosuccinate is then isolated as described in Example 2 and is a white soapy powder having a slight solubility in water.

Example 17

98 parts of maleic anhydride are heated with 40 parts of ethyl alcohol for about 1 hour, forming the acid ethyl ester of maleic acid. Thereupon 270 parts of stearyl alcohol are added together with sufficient sulphuric acid to act as a catalyst. Then 250 parts of toluene are added and the mixture slowly distilled until conversion to the ethyl stearyl maleate is complete. 250 parts of the 50% water solution of sodium bisulphite are then added and the mixture is agitated at 100° C. until a dried sample is soluble in water. The product, which is the sodium salt of ethyl stearyl sulphosuccinate is a white powder showing a moderate solubility in water. The solubility is very much greater than the distearyl ester and the product is usable as a wetting agent for various aqueous dispersions.

Example 18

142 parts of ethylene glycol maleate are agitated with a 50% aqueous solution containing 156 parts of sodium bisulfite. The agitation is maintained at 100° C. until the reaction mixture dissolves in water. Thereupon 1500 parts of monochlorbenzol are added and the water removed by azeotropic distillation. The dried mixture is filtered and the filtrate evaporated, leaving a tough gummy solid which is fairly soluble in water and which constitutes the sodium salt of glycol sulphosuccinate.

Example 19

Ethylene oxide and maleic acid are heated together to form a complex ester. 180 parts of this reaction product are agitated at 100° C. with 150 parts of sodium bisulphite. The reaction proceeds rapidly and as soon as it is complete the mixture is evaporated to dryness and the product is separated from excess bisulphite by dissolving in boiling alcohol, filtering and evaporating the filtrate. The ester of sulphosuccinic acid obtained is a glassy mass which is soluble in water, the solubility depending to some extent on the character of the ethylene oxide maleic acid reaction product.

Example 20

98 parts of maleic anhydride are heated with 130 parts of octyl alcohol at 120° C., producing the acid octyl maleate. 228 parts of this acid ester are then poured into a solution of 126 parts of sodium sulphite in 1000 parts of water and the mixture stirred at 50° C. for some minutes until a clear solution is obtained. This solution may be used as such or it may be evaporated to dryness, a white, amorphous, somewhat sticky product remaining, which is the disodium salt of monooctyl sulphosuccinate. The product is easily soluble in water.

Example 21

92 parts of glycerine and 98 parts of maleic anhydride are heated at 120° C. for 2 hours. The mixture is cooled to 90° C. and poured into a solution of 104 parts of sodium bisulphite in 200 parts of water. The resulting mixture is then agitated for 2 hours at 80° C. and evaporated to dryness. A brittle, glassy mass which is the sodium salt of glycerol sulphosuccinate is obtained. It can be easily ground to a white powder and is very soluble in water.

If ammonium bisulphite is used, the corresponding ammonium salt is produced which is equally soluble in water.

Example 22

124 parts of ethylene glycol are heated at 120° C. for 2 hours with 98 parts of maleic anhydride and the diglycol maleate so obtained is poured into a solution of 104 parts of sodium bisulphite in 150 parts of water. The mixture is agitated at 60° C. until an acidified sample liberates no $SO_2$ whereupon the solution is evaporated to dryness and the product may be ground to a white powder which is exceedingly soluble in water. The product obtained is the sodium salt of diglycol sulphosuccinate.

Example 23

184 parts of glycerine are heated to 120° C. for 1 hour with 98 parts of maleic anhydride. 204 parts of acetic anhydride are slowly added, the temperature being maintained at 120° C. After all of the anhydride has been added the heating is continued for 2 more hours and then the mixture is cooled at 100° C. whereupon 110 parts of sodium bisulphite in 150 parts of water are added and the mixture agitated in a closed vessel at 110° C. for 8 hours, or until the mixture is completely water soluble. Thereupon the mixture is evaporated to dryness and a semitransparent gummy mass is obtained which is readily soluble in water. It is the sodium salt of the glycerine ester of sulphosuccinic and acetic acids.

Example 24

92 parts of glycerine and 282 parts of oleic acid are heated to 200° C. for 12 hours. The mixture is cooled to 120° C. and 196 parts of maleic anhydride are added whereupon the heating is maintained for 3 hours and then 400 parts of normal amyl alcohol and ½ part of sulphuric acid are added. The mixture is distilled until substantially 36 parts of water have collected in the distillate, at which time the esterification is complete. The excess amyl alcohol is removed by steam distillation and the residual oil is agitated at 100° C. for 24 hours with 250 parts of sodium bisulphite. The solution is then evaporated to dryness and a soft resin is obtained which is readily soluble in water. This would be probably as the following formula:

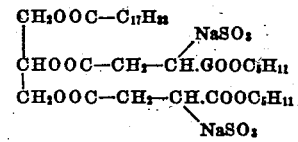

Example 25

148 parts of phthalic anhydride are heated with 88 parts of a primary amyl alcohol at about 100° C. for 2 hours. The acid amyl phthalate obtained is then mixed with 92 parts of glycerine and the mixture heated at 120° C. for four hours. The phthalic anhydride unites with one hydroxyl of the glycerine and the remaining hydroxyls of the glycerine are then esterified with 98 parts of maleic anhydride by heating at 120° to 140° C. for several hours. The ester thus obtained is then sulphonated with 104 parts of sodium bisulphite as described in previous examples and recovered in the usual manner. The glycerine ester of sulphosuccinic acid and acid amyl phthalate is obtained as a powder and is readily soluble in water.

Instead of phthalic anhydride other dibasic acids may be used such as succinic acid, chlormalic acid, tartaric acid and the like.

Example 26

184 parts of glycerine are heated with 148 parts of phthalic anhydride at 130° C. for 4 hours. Thereupon 196 parts of maleic anhydride are added in 1000 parts of tetraline. The mixture is slowly distilled until approximately 54 parts of water have been collected in the distillate. Then the mixture is cooled to 80° C. At this stage mixed phthalic maleic ester of glycerine is obtained. 208 parts of sodium bisulphite dissolved in 300 parts of water are added and the mixture agitated at 80° C. until a sample is completely water soluble. The tetraline is removed by steam distillation and the aqueous solution remaining filtered and dried, the residue is ground and constitutes a glyceryl phthalate sulphosuccinate being a white powder very soluble in water.

Instead of using phthalic anhydride monobasic acids such as benzoic acid or benzoylbenzoic acid can be employed in which case, of course, the proportion of maleic acid is increased.

Example 27

2 mols. of castor oil are esterified with 3 mols. of maleic anhydride resulting in a neutral ester in which the six hydroxyl groups of the castor oil unite with the six hydroxyl groups of the maleic acid. This neutral ester is then treated with 3 mols. of sodium bisulphite to transform it into the corresponding sulphosuccinate. The product is not readily soluble in water but can be rendered soluble by sulphonation with sulphuric acid.

Example 28

An ester of maleic acid and castor oil is prepared but instead of using 2 mols. of castor oil only 1 mol. is used. After transformation into the sulphosuccinate by means of bisulphite, the product can be sulphonated with sulphuric acid or can be treated with caustic alkali to increase the water solubility.

Example 29

172 gms. of butyl maleic acid, obtained by reacting n-butyl aceto-acetic acid ethyl ester in ether with bromine under cooling with ice and treating the brominated product with alcoholic KOH (Walden, Ber. 24, 2038), are dispersed in 50 gms. of water. 105 gms. of sodium bisulphite in 100 gms. of water are added to the dispersion under cooling in a pressure bottle. The closed bottle is gradually within 6 hours heated to 100° C. in a water bath and kept at this temperature for ten hours. Drying the reaction product yields pure monosodium sulphobutyl succinic acid.

276 gms. of the monosodium sulphobutyl succinic acid are esterified with 224 gms. of n-hexyl alcohol in the presence of 1 gm. H$_2$SO$_4$. The resulting ester is completely neutralized and dried at 100° C. in vacuo, whereby the sodium salt of di-n-hexyl sulphobutyl succinate is obtained having the formula

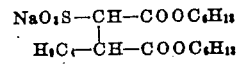

It is a yellowish wax-like hard mass which is easily soluble in water. The aqueous solutions possess excellent wetting properties.

Example 30

To 335 gms. of the di-amyl ester of brom maleic acid (Beilstein 2nd edition, vol. 2, p. 756) 105 gms. of NaHSO$_3$, 60 gms. of water and 120 gms. of ethyl alcohol are added and the mixture heated to boiling under refluxing the condensed vapors. After 8 hours a sample of the reaction mixture dissolves clear in water indicating completion of the reaction. Unreacted sodium bisulphite is filtered off and the filtrate concentrated and dried on the steam bath. The reaction product is a very pure di-amyl sodium sulpho bromosuccinate which is a white brittle material. It is very soluble in water and determines considerable wetting power to its aqueous solution. It has the formula—

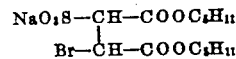

Example 31

206 gms. of benzyl succinic acid (Beilstein 2nd edition, vol. 9, p. 899) are esterified by heating with 224 gms. of ethyl butyl alcohol and separating off the esterification water. The reaction mixture is completely neutralized, dried and filtered. The excess of alcohol is steam distilled off in vacuo. The obtained semipure ester may as such or after its purification be reacted with NaHSO$_3$ by adding 105 gms. NaHSO$_3$, 200 gms. of ethyl alcohol to 374 gms. of the ester. The mixture is boiled and the condensed vapors refluxed. After 10 hours the reaction is completed. Unreacted bisulphite is filtered off and the filtrate concentrated and dried. The dry di-(ethyl butyl) sodium sulpho benzylsuccinate is a white sticky mass which is moderately soluble in water and has the formula—

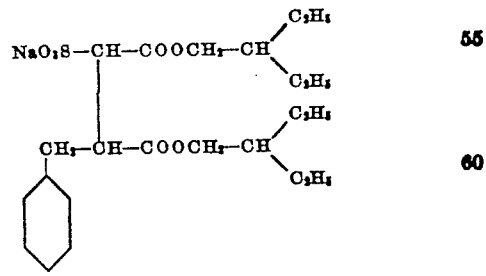

Example 32

The di-ethyl ester of mercapto sulpho succinic acid described in Jour. Russ. Phys. Chem. Soc., 44, 1320–1324 (C. A. 7, 984) is dissolved in water and oxidized by heating with dilute nitric acid. The reaction product is neutralized with caustic soda solution and dried and is the di-sodium salt of di-sulpho succinic acid ethyl ester.

What I claim is:

1. An ester of a sulphonated aliphatic dibasic acid having the formula

in which R is an aliphatic carbon chain substituted by a sulphonic acid group and another substituent selected from the group consisting of hydrocarbon, alkoxy, hydroxyl, halogen and nitro groups directly linked thereto, X is a positive ester-forming radical containing at least 5 carbon atoms and E is a member of a group consisting of hydrogen, a salt-forming radical, and a positive, ester-forming radical.

2. An ester of a sulphonated aliphatic dibasic acid having the formula

in which R is an aliphatic carbon chain substituted by a sulphonic acid group and another substituent selected from the group consisting of hydrocarbon, alkoxy, hydroxyl, halogen and nitro groups directly linked thereto, X is a polyhydric alcohol radical and E is a member of a group consisting of hydrogen, a salt-forming radical, and a positive, ester-forming radical.

3. An ester of a sulphonated aliphatic dibasic acid having the formula

in which R is an aliphatic carbon chain substituted by a sulphonic group and another substituent selected from the group consisting of hydrocarbon, alkoxy, hydroxyl, halogen and nitro groups directly linked thereto, X is the radical of a mono-hydric alcohol containing at least 5 carbon atoms, and E is a member of a group consisting of hydrogen, a salt-forming radical, and a positive ester-forming radical.

4. An ester of an aliphatic dibasic acid having the formula

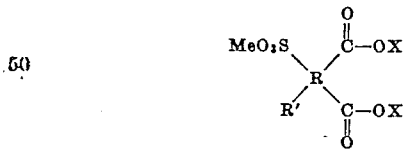

in which R' is a hydrocarbon radical, Me is a member of the group consisting of ammonium and alkali-forming metals, R is an aliphatic carbon chain and each X is an ester-forming group.

5. An ester of an aliphatic dibasic acid having the formula

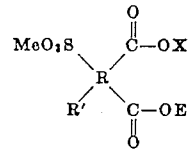

in which R' is a hydrocarbon radical, Me is a member of the group consisting of ammonium and alkali-forming metals; R is an aliphatic carbon chain of less than 5 carbon atoms, X is a positive ester-forming radical and E is a member of the group consisting of hydrogen, a salt-forming radical, and a positive, ester-forming radical.

6. An ester of an aliphatic dibasic acid having the formula

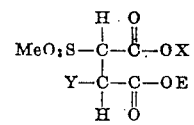

in which Me is a member of the group consisting of ammonium and alkali-forming metals, Y is a member of the group consisting of hydrocarbon, alkoxy, hydroxyl, halogen and nitro groups, X is a positive, ester-forming radical containing at least five carbon atoms and E is a member of the group consisting of hydrogen, a salt-forming radical, and a positive, ester-forming radical.

7. An ester of an aliphatic dibasic acid having the formula

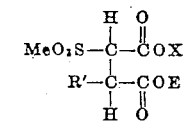

in which Me is a member of the group consisting of ammonium and alkalia-forming metals, R' is an alkyl radical, X is a positive, ester-forming radical containing at least five carbon atoms, and E is a member of the group consisting of hydrogen, a salt-forming radical, and a positive, ester-forming radical.

ALPHONS O. JAEGER.